United States Patent [19]

Kikuchi et al.

[11] Patent Number: 4,637,508

[45] Date of Patent: Jan. 20, 1987

[54] APPARATUS FOR CARRYING AND SEPARATING ARTICLES

[75] Inventors: Kunio Kikuchi, Minami-ashigara; Fujio Kamada, Atsugi; Masao Osawa, Isehara, all of Japan

[73] Assignee: Anritsu Electric Company Limited, Tokyo, Japan

[21] Appl. No.: 743,758

[22] Filed: Jun. 12, 1985

[30] Foreign Application Priority Data

Jun. 18, 1984 [JP] Japan .................................. 59-124873

[51] Int. Cl.$^4$ ............................................. B65G 47/46
[52] U.S. Cl. .................................. 198/365; 198/803.2
[58] Field of Search ............ 198/365, 849, 850, 803.2, 198/487.1, 803.12

[56] References Cited

U.S. PATENT DOCUMENTS 3,190,432  6/1965  Vanderhoof ........................ 198/365

FOREIGN PATENT DOCUMENTS 818925   10/1951  Fed. Rep. of Germany .
1101274  3/1961   Fed. Rep. of Germany .
2005856  8/1971   Fed. Rep. of Germany .
2535903  2/1977   Fed. Rep. of Germany ...... 198/850
58-39729 9/1983   Japan .

OTHER PUBLICATIONS

Prospectus of Messrs., H. H. Wiese GmbH & Co. KG, "Stabrost–Forderband".

*Primary Examiner*—Joseph E. Valenza
*Assistant Examiner*—Kyle E. Shane
*Attorney, Agent, or Firm*—Frishauf, Holtz, Goodman & Woodward

[57] ABSTRACT

An apparatus for carrying and separating articles includes a pair of parallel endless belts made of an elastic material, a plurality of carrying rods bridging the two belts in the transversal direction and carriers each engaged with adjacent carrying rods and capable of sliding relative thereto in transversal directions. Articles are put on the carriers and are separated with displacement of the carriers in transversal directions. The belt has a core buried in it and incapable of elongation or contraction in the length direction. The pair of belts have carrying rod mounting pins projecting from their opposed edges. These pins are coincident with the center of the cores. They each have an engaged portion and an embedded portion, the engaged portion being engaged in an end of a carrying rod, the embedded portion being embedded in a belt. The engaged portion and embedded portion are eccentric with each other, the embedded portion being embedded in a portion not interfering with the core, the engaged portion being found in the vicinity of the core.

6 Claims, 13 Drawing Figures

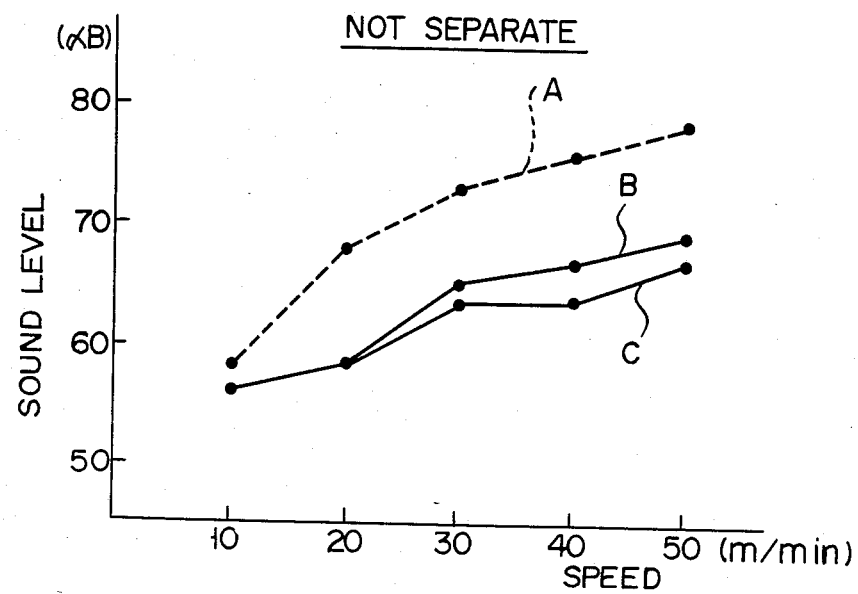
F I G. 11
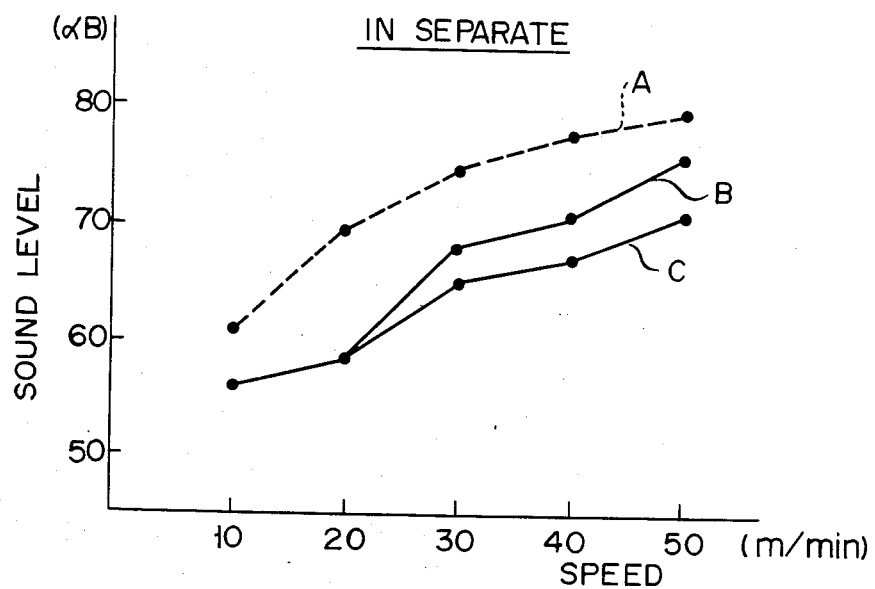
F I G. 12

APPARATUS FOR CARRYING AND SEPARATING ARTICLES

BACKGROUND OF THE INVENTION

This invention relates to an apparatus for carrying and separating articles and, more particularly, to an apparatus for carrying and separating articles, which comprises a pair of conveying means, a plurality of conveying rods bridging the conveying means in a transversal direction crossing the carrying direction, a plurality of carriers each provided between adjacent carrying rods and movable in the transversal direction noted above and separating means, and which carries articles put on the carriers and also can sort them in different categories by moving them in a crosswise direction.

There is known a carrying apparatus, which carries such articles as packed foodstuff and canned goods and automatically sorts out rejected articles (e.g., insufficient weight, damaged package, etc.) among the carried articles detected in an inspection step.

Such an apparatus is disclosed in, for instance, Japanese Patent Publication No. 39,729/83. FIGS. 1 through 4 illustrate the disclosed apparatus. The apparatus comprises a pair of parallel and spaced-apart conveying means each including a pair of sprockets 1 and 2 and an endless roller chain 3 passed round these sprockets. The roller chains 3 of the carrying means are bridged by a plurality of carrying rods 4 which extend in a transversal direction crossing the carrying direction. Both ends of the carrying rods 4 are supported by the respective roller chains 3. The carrying rods 4 are coupled to the roller chains 3 by the engagement of pins 10 of the roller chains in engagement holes formed in the ends of the carrying rods. More specifically, each pin 10, which pivotally couples together adjacent links of each roller chain 3, has an inward extension extending sidewise, which is received in the corresponding engagement hole. A plurality of carriers 5 are each provided between adjacent carrying rods 4 in an engagement relation thereto and slidable relative thereto in the transversal direction. The carriers 5 each have a pair of drive pins 6 depending from the opposite ends. Separating means is provided beneath the carriers 5. The separating means includes a pair of separating guides 7 extending in a horizontal direction and at an angle to the carrying direction of the carriers 5. The separating guides 7 are each mounted at the rear end of a pin. They are rotatable in a vertical plane around their pins so that their front ends can be displaced in vertical directions.

This apparatus can carry articles, e.g., canned goods, which are transferred onto the carriers 5 from an inlet side conveyor 8. The separating guides 7, i.e., their front ends, are normally at a lower position, which is reached as a result of their rotation in the counterclockwise direction in FIG. 1. In this state, the drive pins 6 depending from each carrier are not in engagement with the separating guides 7, so that the carrier 5 is moved only in the carrying direction to carry the canned good supported on it to a first outlet side conveyor 9A. When it is detected in an inspection step that the weight of the canned good is insufficient, one of the separating guides 7 is rotated in the clockwise direction by a corresponding signal, bringing its front end into engagement with the corresponding drive pin 6 of the carrier 5. As a result, the drive pin 6 is moved along the separating guide 7 in engagement with it, so that the carrier 5 is moved in a transversal direction as it is moved in the longitudinal direction, i.e., the carrying direction. The canned good having insufficient weight supported on this carrier 5 is thus transferred to a second outlet side conveyor 9B. When a damaged canned good is detected in the inspection step, the other separating guide 7 is rotated likewise by a corresponding signal. The pertinent carrier 5 this time thus is moved transversally in the opposite direction to that noted above. The rejected canned good is thus transferred to a third outlet side conveyor 9C.

The prior art apparatus as shown above, however, has a drawback that it produces great noise during operation. The noise is mostly produced from the portions where the roller chains 3 and carrying rods 4 are coupled to one another.

To prevent the generation of such noise, it has been contemplated to use, in lieu of the metal roller chains, belts made of an elastic material such as synthetic rubber. Where rubber belts are used, however, they will vary the distance between adjacent carrying rods with their elongation, contraction, flexing, etc. This will increase a gap between the carrier slidably engaged between adjacent carrying rods and these carrying rods, thus resulting in rattling. Or it will sometimes reduce the gap noted above, disabling smooth sliding of the carrier.

SUMMARY OF THE INVENTION

The present invention seeks to reduce the noise noted above during the operation of the carrying apparatus by the use of endless belts with teeth made of an elastic material for the carrying means. These belts each have a buried core serving to prevent their elongation and contraction. The belts have pins projecting from their opposed sides. Opposite ends of the carrying rods are coupled to the belts with the pins fitted in them. The pins substantially coincide in position with the center of the core in the thickness direction thereof. The core will reduce the elongation and contraction of the belt, and hence variations of the distance between adjacent pins. When the belt flexes around a pulley, its portion on the inner side of the core is contracted while its portion on the outer side of the core is elongated, and the length of the core retains constant. Thus, even in the flexing portion of the belt the distance between adjacent pins is not varied for the pins are coincident with the core. Rattling between the carrying rods and the carriers thus can be prevented, and also smooth sliding of the carriers can be ensured.

In an embodiment of the invention, each of the pins has an embedded portion embedded in the belt and an engaged portion engaged in an engagement hole formed in an end of the carrying rod. The engaged portion and embedded portion are eccentric with each other to ensure that the engaged portion is coincident with the center of the core even if the embedded portion is embedded in a portion of the belt deviated from the core.

Also, in the embodiment of the invention, the engaged portion of the pin is slightly deviated from the center of the core toward the side with teeth, i.e., inner side, of the belt. Therefore, the distance between adjacent pins is slightly reduced in a flexing portion of the belt around a pulley or the like. This means that in the flexing portion of the belt around the pulley, the distance between adjacent carrying rods is slightly reduced to pinch the carrier engaged therebetween. This has an effect of preventing the rattling of the carrier that might otherwise be caused by centrifugal forces exerted to the carrier when the carrier is proceeding around the pulley.

Further, in the embodiment of the invention the embedded portion of the pin has a crescent sectional profile. Its plane surface corresponding to the chord of the crescent section is in close contact with the flat core. The pin thus is firmly secured to the belt.

BRIEF DESCRIPTION OF THE DRAWINGS

FIGS. 11 and 12 are graphs showing noise sound levels of the embodiment of the apparatus and a prior art apparatus using roller chains, respectively, during operation.

DETAILED DESCRIPTION OF THE PREFERRED EMBODIMENT

Figure 1:
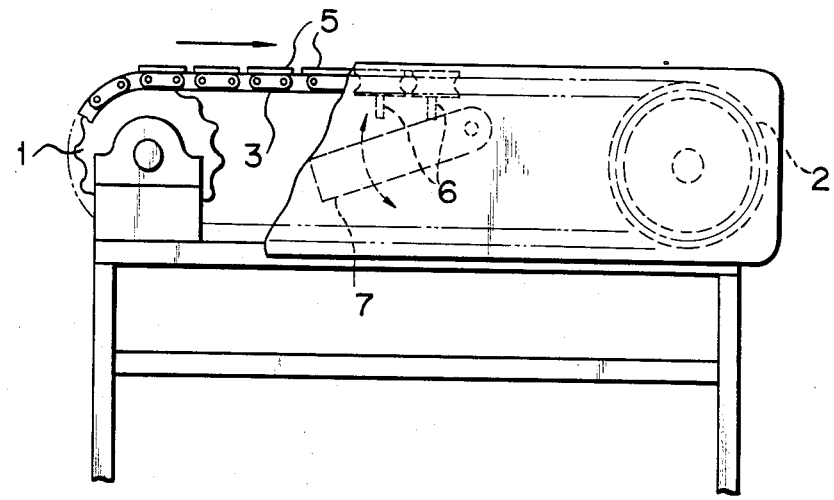
FIG. 1 is a side view showing the prior art apparatus.

FIGS. 5 through 10 illustrate an embodiment of the apparatus according to the invention. This embodiment has the same construction as the prior art apparatus noted before except for the conveying means, and parts like those in the prior art apparatus are designated by like reference numerals and symbols.

The apparatus illustrated has opposite side pulley pairs each consisting of opposite end pulleys 20. Endless belt assemblies 21 are each passed round the two pulleys in each pair. The belt assemblies 21 and pulleys 20 constitute the carrying means. The two belt assemblies 21 are in a parallel and transversally spaced-apart relation to each other. A plurality of carrying rods 4 bridge the two belt assemblies 21 in the transversal direction, with their opposite ends coupled to the belt assemblies 21. When the pulleys 20 are driven from a driving mechanism (not shown), the belt assemblies 21 are driven to move the carrying rods 4 in unison with the belt assemblies 21. An intermediate portion of the upper run of each belt assembly is supported by a support rail 28 having an L-shaped sectional profile, so that its sagging is prevented. A friction sheet made of a synthetic resin material having a small coefficient of friction, is stretched over the top of the support rail 28 to reduce the frictional resistance between the belt assembly 21 and support rail 28. A plurality of carriers 5 are each engagedly supported between adjacent carrying rods 4 such as to be slidable relative to the rods in the transverse directions. The carriers 5 each have drive pins depending from the opposite ends. Separating means of the same structure as in the prior art noted before, can engage with the drive pins to cause displacement of the carriers in the transversal directions.

The belt assemblies 21 each consist of a belt 22 made of an elastic material and a plurality of pins 32 embedded in the belt and projecting from one edge thereof. The belt 22 is an endless belt and has a plurality of inner teeth 26. It is made of such elastic materials as nitrile rubber and polyurethane resin. The belt 22 has a core 24 buried integrally in its central portion. The core 24 is strip-like in shape and is formed by braiding polyester resin fibers, steel wires, etc. It has a predetermined flexibility, but will hardly undergo elongation or contraction in its length direction. When the belt 22 flexes as it proceeds round a pulley 20 or the like, its portion on the inner side of the core 24 is contracted while its portion on the outer side of the core 24 is elongated, and the core 24 flexes without undergoing elongation or contraction in its length direction.

The pins 32 that project from opposed edges of the pair of belts 22, are made of a metal or synthetic resin material having a comparatively high mechanical strength, e.g., polycarbonate resin. They each have a cylindrical engaged portion 42, a large diameter portion 40 concentric with and extending from the engaged portion 42, and an embedded portion 44 extending from the large diameter portion 40 and having a crescent sectional profile. In this embodiment, the sectional profile of the embedded portion 44 is what is obtained by removing part of a circle having the same diameter as the large diameter portion 40 along a chord.

The belt 22 has a plurality of raised portions 52 having a semi-circular sectional profile. These raised portions 52 are provided on the side of the core 24 opposite the teeth, i.e., on the outer side of the core 24. The belt has transversal crescent embedding holes 50 formed in the respective raised portions 52. Of the inner surfaces defining each embedding hole 50, the plane surface corresponding to the chord of the crescent section is constituted by the outer surface of the strip-like core 24.

The embedded portion 44 of each pin 32 noted above is pressure fitted in each embedding hole 50 and is clamped and secured in position by the elastic force of the elastic material of the belt 22. The plane surface of the embedded portion 44 corresponding to the chord of the crescent section is held in close contact with the outer surface of the core 24 by the elastic force noted above. A portion of the large diameter portion 40 of the pin is removed along a plane 46 so that the large diameter portion will not protrude inwardly from the top surface of the corresponding tooth 26.

The distance between the plane surface of the embedded portion 44 and the extension of the center line of the engaged portion 42 is set equal to one-half of the thickness of the core 24. Thus, the center of the engaged portion 42 substantially coincides with the center of the core 24. In this embodiment, the center line of the engaged portion 42 is deviated inwardly by a slight distance d from the center line of the core 24.

The engaged portion 42 is fitted in an axial engagement hole formed in each end of carrying rod 4, whereby the carrying rod 4 is supported by the opposed belts 22 via the respective pins 32.

With the embodiment of the apparatus having the above construction according to the invention, in which the carrying means uses the belts 22 made of an elastic material, vibrations and the like are absorbed by the elastic material of the belts to reduce the noise sound level.

Since the core 24 is buried in the belt 22, the elongation and contraction of the belt is prevented. Further, since the pins project from the vicinity of the core, the distance between adjacent pins, i.e., distance between adjacent carrying rods, is not varied even when the belt is flexed. Thus, rattling of the carriers can be prevented, and also smooth sliding thereof can be ensured. Also, by virtue of the close contact of the plane surface of the embedded portion of the pin with the surface of the core, firmer coupling between the pin and belt can be obtained.

Still further, since in this embodiment the engaged portion of the pin is deviated inwardly with respect to the center of the core, the distance between adjacent pins, i.e., adjacent carrying rods, is reduced when the belt flexes in proceeding round a pulley or the like so that the carrier is pinched between the adjacent carrying rods to prevent its rattling that might otherwise be caused by centrifugal forces. When the carrier is proceeding around the pulley, it is not moved in a transversal direction. At this time, therefore, the carrier may be pinched and be incapable of sliding in the transversal direction.

Figure 2:
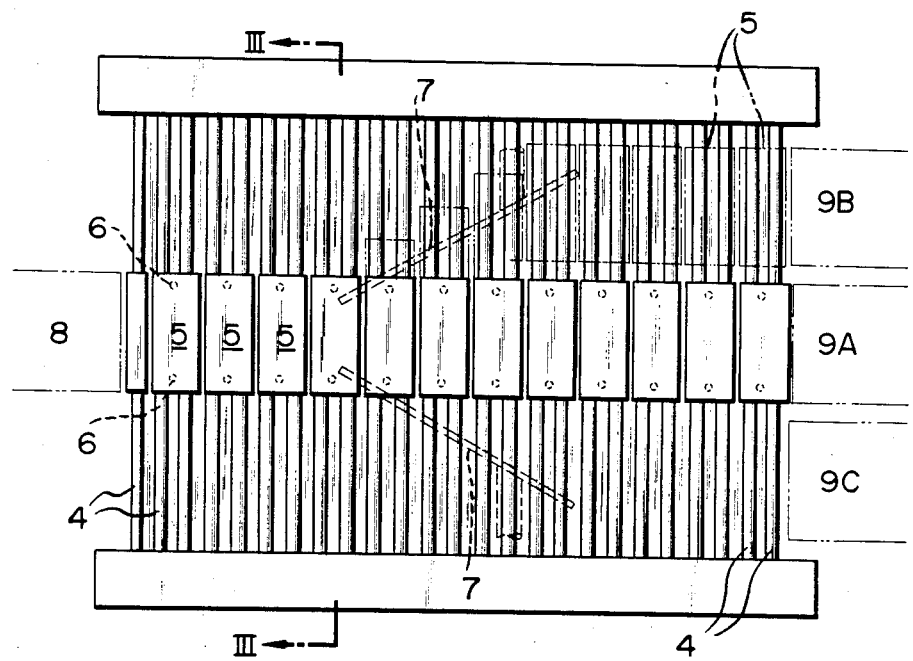
FIG. 2 is a plan view showing the apparatus of FIG. 1.
Figure 3:
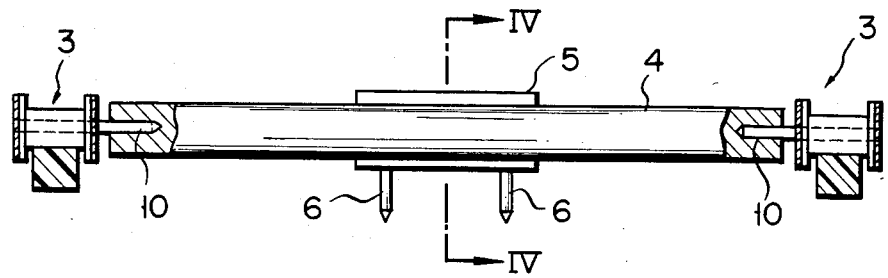
FIG. 3 is a sectional view taken along line III—III in FIG. 2.
Figure 4:
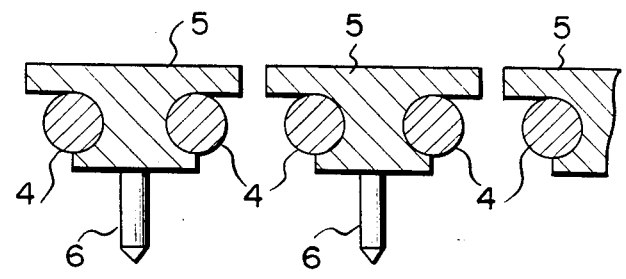
FIG. 4 is a sectional view taken along line IV—IV in FIG. 3.
Figure 5:
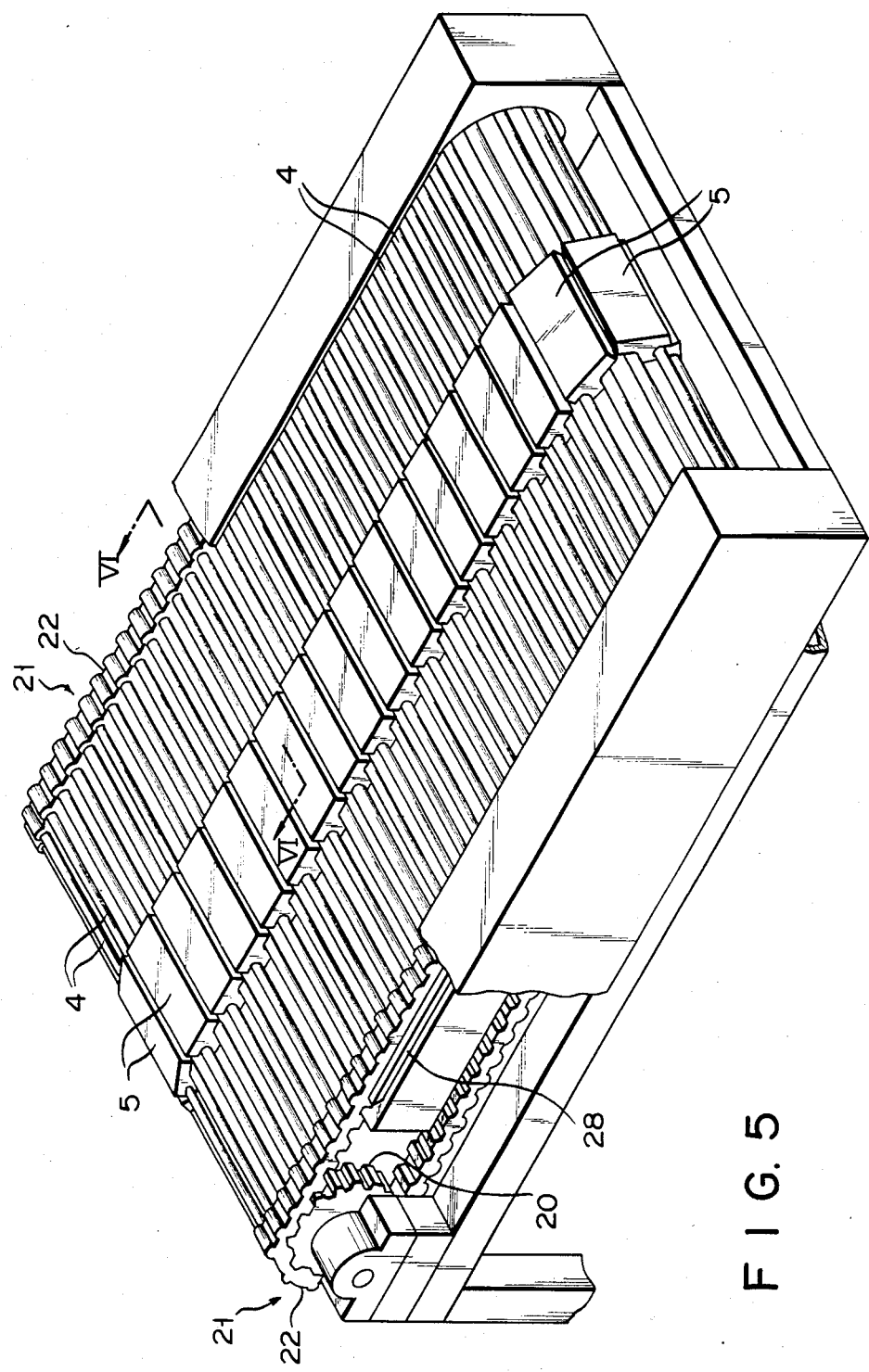
FIG. 5 is a perspective view showing an embodiment of the carrying/separating apparatus according to the invention.
Figure 6:
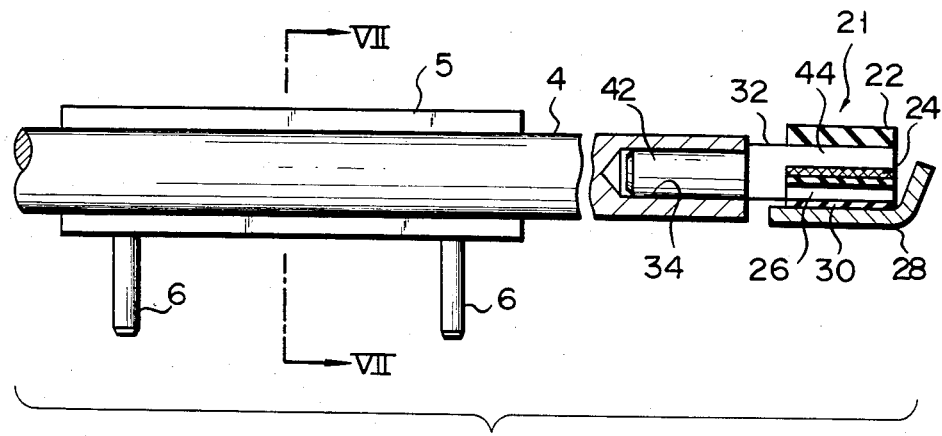
FIG. 6 is a sectional view taken along line VI—VI in FIG. 5, showing a portion of the apparatus shown in FIG. 5.
Figure 7:
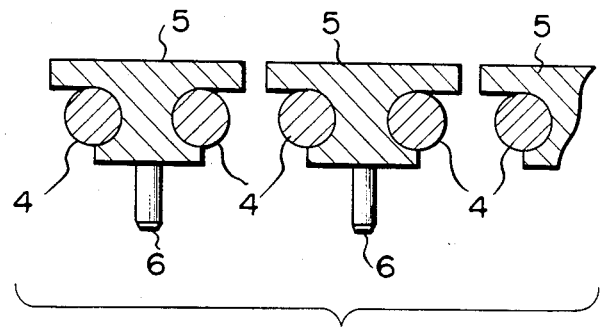
FIG. 7 is a sectional view taken along line VII—VII in FIG. 6.
Figure 8:
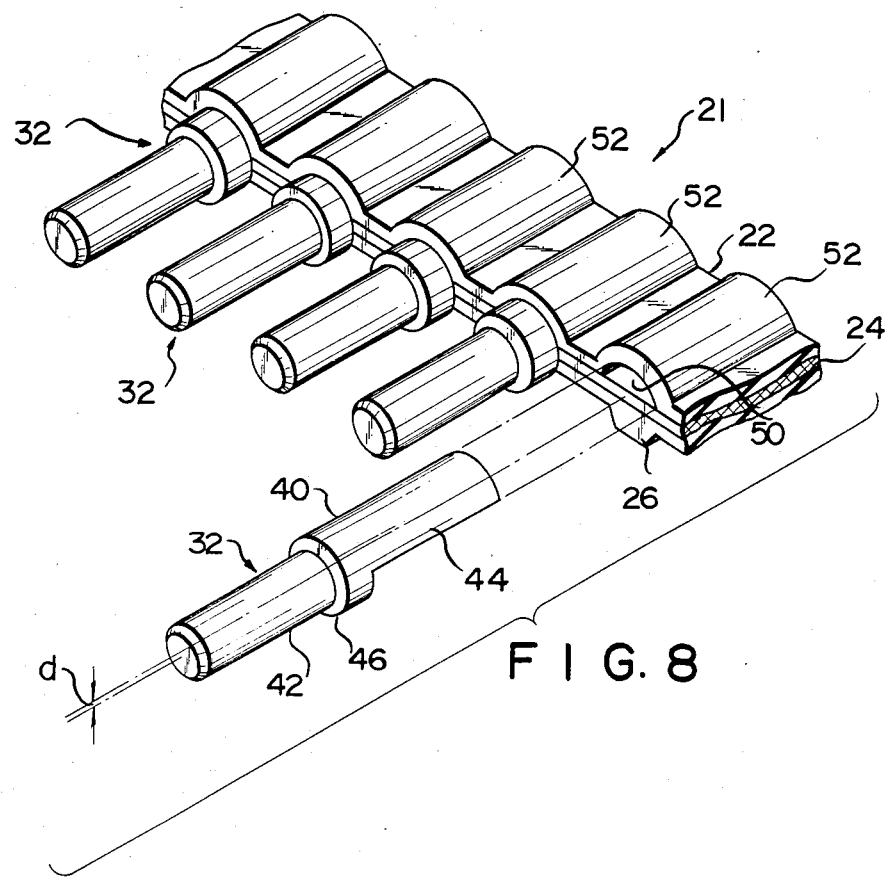
FIG. 8 is a fragmentary perspective view, to an enlarged scale, showing a portion of a belt with pins mounted therein.
Figure 9A:
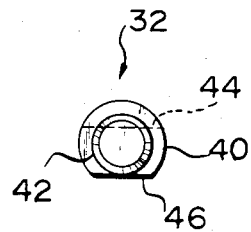
FIGS. 9A and 9B illustrate a pin, in an elevational view in FIG. 9A and in a side view in FIG. 9B.
Figure 9B:
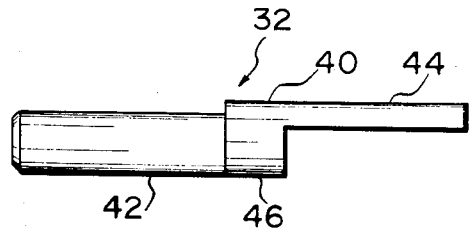

FIGS. 11 and 12 show the results of the tests conducted on the embodiment as to the effect of reduction noise. FIG. 11 shows the data obtained when the separating means was not operated. FIG. 12 shows the data obtained when this means was operated, displacing the carriers in transversal directions. Line A in either figure indicates the noise characteristic of the prior art apparatuses (FIGS. 1 and 2) each using roller chains 3 made of metal and carriers 5 made of polyacetal resin. Lines B and C in either figure show the noise characteristics of the two embodiments of the invention, each using a core 24 made of polyester resin fiber, inner teeth 26 and raised portions 52 made of polyurethane resin and pins 32 made of polycarbonate resin. The embodiments are different only in the materials of their carriers 5. The carriers of the embodiment, whose noise characteristic is indicated by line B, are made of polyacetal resin, those of the other embodiment, whose noise characteristic is shown by line C, are made of thermoplastic polyester elastomer. The noise was measured by a "Sound Level Meter" manufactured by Onkyo Sokki Co., Ltd., in A scale, at a position spaced apart 1.0 m from the inlet side of each apparatus and at a height of 1.0 m from the floor.

As evident from FIGS. 11 and 12, the apparatuses of this invention, which use belts, make far less noise than the conventional ones. Further, the embodiment using carriers made of thermoplastic polyester elastomer makes less noise than the embodiment using carriers made of polyacetal resin. Obviously, the noise characteristic shown in FIG. 12 is worse than that shown in FIG. 11. However, the noise represented in FIG. 12 is made by the guides 7 only when they rotate to sort articles. The noise made by the guides 7 at all other times is indicated in FIG. 11. In other words, such a noise as shown in FIG. 12 is made only when the separating means is operated.

Figure 10:
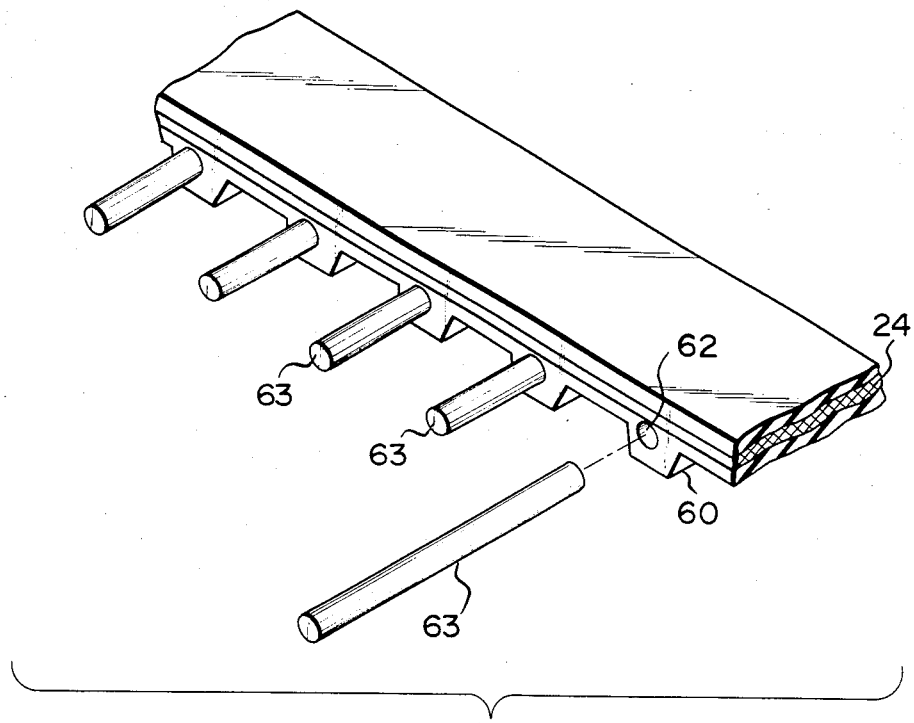
FIG. 10 is a fragmentary perspective view showing a different example of a belt with pins mounted therein.

FIG. 10 shows a different example of the belt and the pin. This example is applicable to a case where comparatively light weight articles are carried. The belt has embedding holes formed in portions corresponding to respective teeth 60 and contiguous to the core 24. In this instance, the pin 63 is deviated inwardly with respect to the core by an amount equal to the sum of the diameter of the pin and one-half the thickness of the core 24.

The coupling of the pin and the belt with the embedded portion of the pin elastically pressure fitted in the embedding hole of the belt, is by no means limitative. For example, the embedded portion of the pin may be molded in the belt when producing the belt. As a further alternative, the pin may be an integral portion of the belt of the elastic material or of the core.

After the pin is pressure fitted in the belt, there is no need of providing any mechanical detachment prevention means.

Further, the belt need not have raised portions, i.e., it may have a uniform thickness.

Also, the sectional shape of the embedded portion of the pin is not limited to the crescent shape.

Moreover, the above embodiment is by no means limitative, and various changes and modifications are possible without departing from the scope of the invention.

What is claimed is:

1. An apparatus for carrying and separating articles, comprising:
   a pair of parallel carrying means;
   a plurality of carrying rods bridging said pair of carrying means;
   a number of carriers each provided between adjacent ones of said carrying rods for relative sliding movement; and
   separating means for moving said carriers in transverse directions;
   wherein each said carrying means includes:
   an endless belt with teeth formed of an elastic material, a core embedded in said elastic material, said core being flexible but substantially incapable of elongation or contraction in the length direction, a plurality of pins projecting from the inner side surface of said belt, and opposite ends of said carrying rods are mounted on said belts by said pins;
   each of said pins has an embedded portion and an engaged portion, said embedded portion being embedded in a region of the associated belt not occupied by the core, said engaged portion being fitted in an end of the associated carrying rod; and
   said embedded portion of each pin has a crescent sectional profile, a plane surface of said embedded portion corresponding to the chord of the crescent section is in close contact with one surface of said core, and a stepped portion is provided in each pin in a region connecting said embedded portion and the remaining part of the pin, said stepped portion abutting said inner side surface of each belt.

2. The apparatus according to claim 1, wherein said pins are mounted on said belt at locations corresponding to said teeth.

3. The apparatus according to claim 2, wherein each belt has raised portions formed on a side of said core opposite to the side on which said teeth are provided and at locations corresponding to said teeth; embedding holes extending in the transversal direction of the belt are formed at locations corresponding to said raised portions; and each pin is fitted in each embedding hole, and clamped and secured in position by an elastic force of the elastic material of the belt.

4. The apparatus according to claim 1, wherein said engaged portion of each pin is deviated toward the tooth side with respect to the core of the belt.

5. An endless belt assembly with teeth for use with apparatus for carrying and separating articles, wherein said belt assembly comprises:
- an endless belt made of an elastic material and having a core embedded in said elastic material, said core being flexible but substantially incapable of elongation and contraction in the length direction;
- a plurality of pins projecting from one side surface of said belt and coincident in position with the center of said core in the thickness direction thereof, each pin including:
- an embedded portion having a crescent sectional profile, said embedded portion being embedded in a region of said belt which is not occupied by said core, a plane surface of said embedded portion corresponding to the chord of the crescent section being in close contact with one surface of said core;
- an engaged portion; and
- a stepped portion provided in a region connecting said embedded portion and the remaining part of the pin, said stepped portion abutting an inner side surface of each belt.

6. The belt assembly according to claim 5, wherein each belt has raised portions formed on one side of said core opposite to the other side on which said teeth are provided and at locations corresponding to said teeth; embedding holes extending in the transversal direction of the belt are formed at locations corresponding to said raised portions; and each pin is fitted in each embedding hole, and clamped and secured in position by an elastic force of the elastic material of each belt.

* * * * *